(12) United States Patent
Thielemans

(10) Patent No.: US 6,717,625 B1
(45) Date of Patent: Apr. 6, 2004

(54) METHOD AND DEVICE FOR ADJUSTING ONE OR MORE PROJECTORS

(75) Inventor: Robbie Thielemans, Deerlijk (BE)

(73) Assignee: Barco N.V., Poperinge (BE)

( * ) Notice: Subject to any disclaimer, the term of this patent is extended or adjusted under 35 U.S.C. 154(b) by 0 days.

(21) Appl. No.: 09/555,614

(22) PCT Filed: Dec. 1, 1998

(86) PCT No.: PCT/BE98/00186

§ 371 (c)(1),
(2), (4) Date: Aug. 31, 2000

(87) PCT Pub. No.: WO99/29116

PCT Pub. Date: Jun. 10, 1999

(30) Foreign Application Priority Data

Dec. 1, 1997 (BE) .............................. 9700971

(51) Int. Cl.⁷ .............................. H04N 3/22; H04N 9/33; H04N 17/00
(52) U.S. Cl. .............. 348/745; 348/177; 348/180; 348/187; 348/657; 348/806; 348/808
(58) Field of Search ................ 348/47, 139, 159, 348/177, 178, 179, 180, 184–189, 190, 191, 655–658, 744, 745–747, 806–808; H04N 17/00, 9/73, 3/22

(56) References Cited

U.S. PATENT DOCUMENTS

| | | | |
|---|---|---|---|
| 5,091,773 A | | 2/1992 | Fouche et al. |
| 5,136,390 A | | 8/1992 | Inova et al. |
| 5,231,481 A | | 7/1993 | Eouzan et al. |
| 5,396,257 A | | 3/1995 | Someya et al. |
| 5,455,647 A | * | 10/1995 | Fujiwara ..................... 353/101 |
| 5,506,481 A | | 4/1996 | Wada et al. |
| 5,532,764 A | * | 7/1996 | Itaki ........................... 348/745 |
| 5,532,765 A | | 7/1996 | Inoue et al. |
| 5,742,698 A | * | 4/1998 | Minami et al. ............. 382/100 |
| 5,754,222 A | * | 5/1998 | Daly et al. .................. 348/184 |
| 5,796,425 A | * | 8/1998 | Minami et al. ............. 348/181 |
| 5,835,135 A | * | 11/1998 | Hamaguri et al. .......... 348/191 |
| 5,883,476 A | * | 3/1999 | Noguchi et al. ........ 315/368.12 |
| 5,969,756 A | * | 10/1999 | Buckley et al. ............. 348/190 |
| 6,016,161 A | * | 1/2000 | Robinson ................... 348/187 |
| 6,061,102 A | * | 5/2000 | Sheppard et al. .......... 348/745 |
| 6,222,593 B1 | * | 4/2001 | Higurashi et al. .......... 348/745 |
| 6,483,537 B1 | * | 11/2002 | Mayer et al. ............... 348/180 |
| 6,483,555 B1 | * | 11/2002 | Thielemans et al. ....... 348/745 |
| 6,538,705 B1 | * | 3/2003 | Higurashi et al. .......... 348/745 |

FOREIGN PATENT DOCUMENTS

| | | |
|---|---|---|
| BE | 09600536 | 6/1998 |
| WO | WO 93/20660 | 10/1993 |

* cited by examiner

*Primary Examiner*—John Miller
*Assistant Examiner*—Brian Yenke
(74) *Attorney, Agent, or Firm*—Jack V. Musgrove

(57) ABSTRACT

Method for adjusting one or more projectors, each projector generating a number of light beams of different color, characterized in that the projected picture (9-9A) is automatically adjusted during normal use of the projector (1-1A).

27 Claims, 4 Drawing Sheets

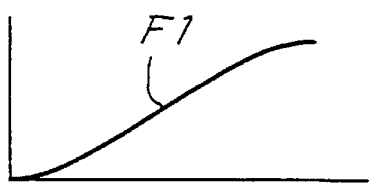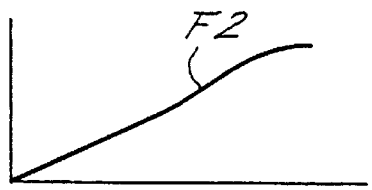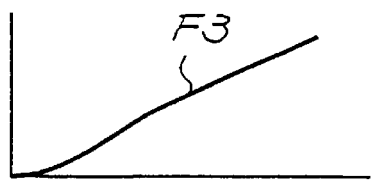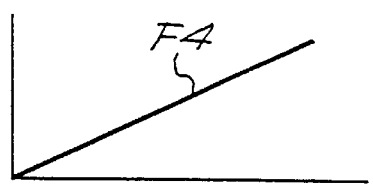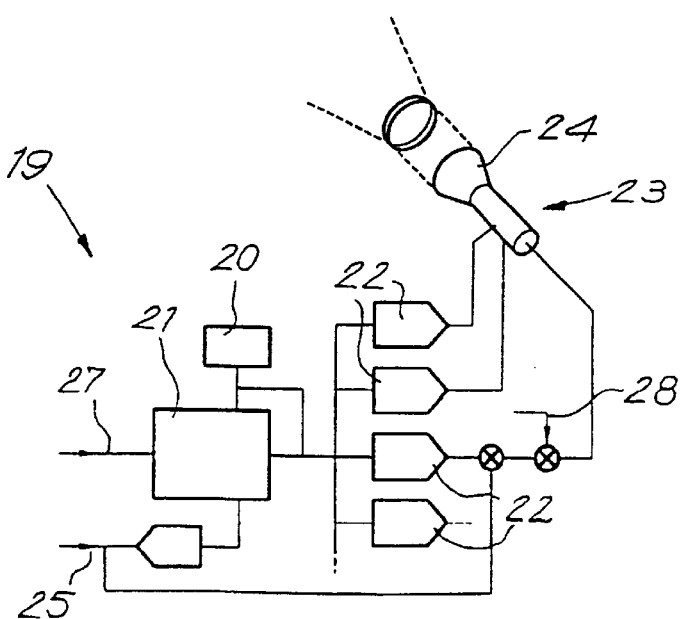

METHOD AND DEVICE FOR ADJUSTING ONE OR MORE PROJECTORS

The present invention relates to a method and a device for adjusting, one or more projectors.

The initial aim of the invention is for it to be used to adjust one or more CRT (Cathode Ray Tube) projectors. However, in general terms it can also be used for other projectors, more particularly LCD (Liquid Crystal Display) projectors or so-called light valve projectors, as well as matrix-addressed projectors.

As is known, a CRT projector customarily comprises three cathode ray tubes, respectively a green, a red and a blue tube which are each able to generate a light beam, respectively in the colors mentioned above. The light from each of these cathode ray tubes is directed towards a common screen by means of projection means which are provided for this purpose, so that three separate pictures are formed, which are superposed on one another on the screen. By superposing the three colors and varying the intensity of these colors, it is possible to obtain different colors.

Owing to the fact that separate light beams are used, and moreover these light beams are produced separately and guided to the screen along different paths, various aberrations may occur, both between the different colors and relating to the light of one color.

Therefore, it is also clear that in order to obtain an optimum picture various corrections have to be carried out in order to minimize the aberrations mentioned above. As is known, it is possible to make provision for various corrections, including: convergence, geometry, focus, astigmatism, contrast modulation and gamma correction, as well as others, as will emerge from the description below.

It is also possible to provide corrections which aim to achieve a particular effect, for example in order to create so-called soft edge, the meaning of which is that the projected picture is gradually attenuated at the location of the edge, for example in order to prevent the formation of a brightly illuminated strip in the event of two projected pictures emanating from two projectors overlapping.

Furthermore, it is possible to provide corrections relating to the so-called adjoining geometry and/or overlapping geometry. The adjoining geometry is the geometry of pictures which are projected next to one another by two or more projectors. The overlapping geometry relates to pictures which are projected on top of one another by two or more projectors. This may arise both in the case of different pictures which are to form a single entity and in the case of identical pictures which are projected on top of one another in order to increase the light intensity.

A device and method for carrying out corrections of this nature have already been described in Belgian Patent Application No. 09600536 in the name of the current applicant. According to this application, the abovementioned corrections are brought about by splitting up a test picture which is projected onto the screen into one or more zones which are to be adjusted, by viewing the picture with the aid of a camera, the camera signal being digitized, by compiling a mathematical model with the aid of the digitized values obtained, and by using this mathematical model to form control signals in order to carry out the correction in question. In this case, the correction is carried out prior to normal use of the projector.

U.S. Pat. No. 5,136,390 has disclosed a method for correction which is intended to create a so-called soft edge, also known as "seamless video display", in such a manner that various pictures can be projected so as to overlap at their edges, in such a way that the light intensity at the location of the transition is such that this transition shows up to the least possible extent. According to this American patent, to do this, factors which are respectively associated with the intensity of the various parts or "pixels" of the picture are stored in a memory. The intensity of the light is modified as a function of the location where it is incident on the screen, in accordance with the factor which has been stored for that pixel of the picture. By changing the factors mentioned above, it is thus possible to obtain various effects. According to U.S. Pat. No. 5,136,390, to do this the appearance of the projected picture is viewed and the desired changes are input via a keyboard of a computer. The drawback of this is that it is a very time-consuming operation and that correction of this nature is relatively inaccurate.

It should also be pointed out that the correction of soft edge is very subjective, since everyone's perception of color is different. Since, according to U.S. Pat. No. 5,136,390 the feedback is manual and the mathematical model is therefore adapted manually, the result obtained depends on the person carrying out these amendments and on his/her perception of the projected picture. It is clear that this will not provide an optimum result for all viewers.

Moreover, it is clear that this method is only suitable for realizing such soft edge.

In U.S. Pat. No. 5,532,765 is described an apparatus for correcting images. Preferably tetrahedron shaped waveforms with rising and falling linear portions are generated. Therefrom a position of the centroid and a level of the image signal are calculated, on the basis of which error values are calculated. The position of the centroid and the error values are supplied to a correction signal generating circuit, which generates correction signals. These correction signals are supplied to a corrector in the display device.

The correction signal generating circuit includes a correction waveform generating circuit, which generates kinds of fundamental correction waveforms minimally required for correction. Correction data for each adjustment point is stored in a memory, and data interpolation is performed in the horizontal and vertical directions, thus creating a desired correction waveform. Nothing has been done to overcome known drawbacks of known interpolation methods.

A drawback of the apparatus described hereinabove is the fact that a specified test pattern is needed, which makes real-time error corrections impossible.

The object of the invention is to provide a method and device for adjusting one or more projectors, making it possible to optimize the method and device described in BE 09600536 while avoiding various drawbacks of the system described in U.S. Pat. No. 5,136,390 in the event that the correction is used for the so-called soft edge application.

To this end, the invention provides a method for adjusting one or more projectors, each projector generating a number of light beams of different color, characterized in that the projected picture is automatically adjusted during normal use of the projector. Owing to the fact that the projected picture is adjusted during normal use of the projector, i.e. during projection to the public, it is always possible to obtain an optimum picture, or at least to attempt to obtain an optimum picture. It is thus possible to prevent errors which arise from the fact that certain corrections are affected by factors which are not known or do not have any influence during the initial correction.

In a preferred embodiment, the projected picture will be at least adjusted via a feedback.

In a particular embodiment, mathematical models which are based on the influencing factors which are relevant for the particular adjustment will be used for carrying out the adjustment.

According to another particular aspect of the invention, the mathematical models, during use of the projector, are adapted as a function of the result obtained.

According to the invention, the adjustment can be carried out while the projector is in use, on the basis of the various signals. To this end, it is possible, for example, to make use of a signal emanating from a cameras which is directed at the picture.

According to a variant, it is also possible to make use of a video signal which does not necessarily emanate from the abovementioned camera. More particularly, in this case, use will be made of the video signal which is supplied to the input, in other words the signal which comprises the picture which is to be projected.

The invention also provides for a special interpolation technique which can be used in the method mentioned above. According to the invention, this interpolation technique may also be used in projectors which do not employ the abovementioned method of automatic adjustment during normal use of the projector.

According to the invention, to carry out the interpolation, a number of basic waveforms are used, for at least three successive adjustment-point locations, data relating to the directional coefficients of the connecting lines between the values associated with these adjustment-point locations is collected, and a choice is made about the basic waveforms used to carry out the interpolation as a function of this data relating to the directional coefficients.

This interpolation technique is particularly suitable for using a limited number of observed points to determine intervening points, in which case this may involve data observed by a camera and data stored in a memory.

Furthermore, the invention also relates to a device, more particularly an electronic circuit, for carrying out the method mentioned above, and to projectors which are equipped with a device of this nature.

The characteristic features of the abovementioned interpolation technique and device will emerge from the following description.

In order to explain the characteristic features of the invention more clearly, a few preferred embodiments are described below as examples, without these examples having any limiting nature, with reference to the appended drawings, in which:

FIG. 1 diagrammatically depicts a projection system which is provided with one or more projectors according to the invention;

FIG. 2 diagrammatically depicts a test picture which can be generated by projectors of this nature;

FIG. 3 shows a transfer curve which illustrates the relationship between an input signal and the light intensity of the optical signal obtained;

FIG. 4 diagrammatically explains the principle of soft edge;

FIGS. 5, 6 and 7 diagrammatically depict a number of projectors according to the invention;

FIGS. 10 to 15 illustrate a particular interpolation technique;

FIG. 16 depicts a device according to the invention.

Figure 1:
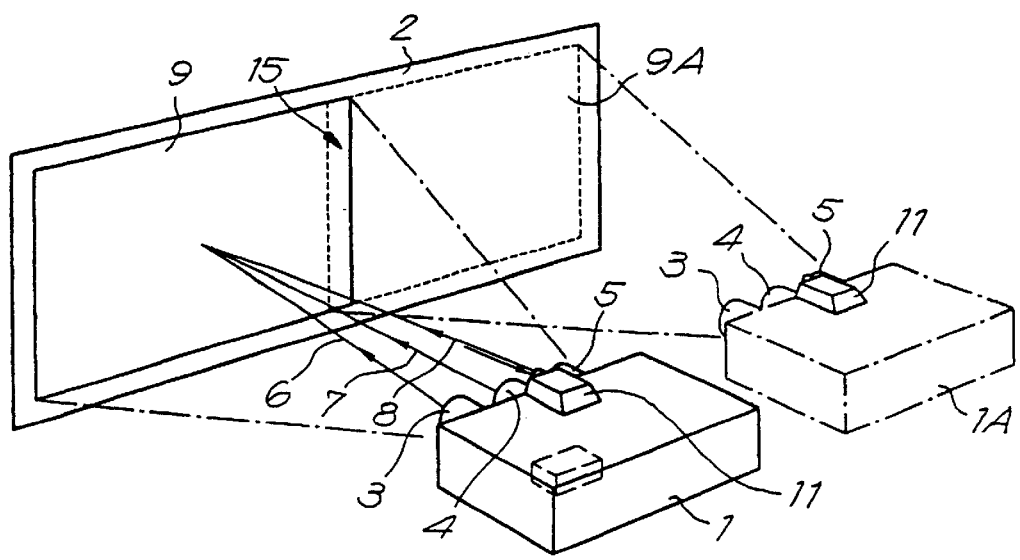

FIG. 1 diagrammatically depicts an arrangement of a CRT projector 1 with respect to a screen 2. The projector 1 contains three picture-forming elements, in this case cathode ray tubes 3-4-5, with optical lenses placed in front of them, which are respectively used to generate a red light beam, a green light beam and a blue .light beam, respectively 6-7-8. These light beams are simultaneously moved across the screen 2 in a known manner, different colors being obtained on the screen 2 by overlapping the light and adjusting the intensities of each color.

It is clear that the light beams 6-7-8 have to be controlled very precisely in order to prevent the formation of aberrations in the picture 9, which adversely affect the picture seen by the viewers. It is thus necessary to provide for the appropriate correction.

An initial mechanical and electrical correction to the projector 1 is carried out, as early as when it is being manufactured, as is explained, inter alia, in the abovementioned BE 09600536.

It is known that this initial correction carried out during manufacture does not ensure an optimum picture. Therefore, it is also customary to provide a projector 1 of this nature with means, which allow the user to carry out further correction.

Figure 2:
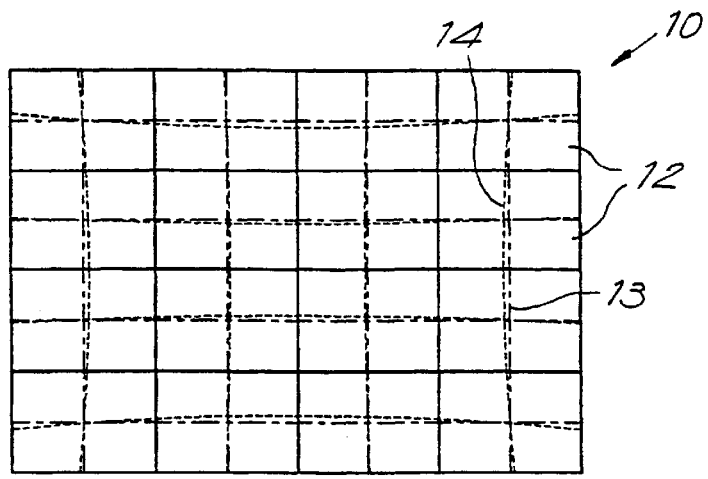

As is known, this correction is carried out with the aid of a test picture 10, for example as illustrated in FIG. 2. The correction is carried out by adjusting the control unit of the projector 1 until the test picture 10 is optimal. This can be achieved by means of a distance control or, as described in BE 09600536, with the aid of a camera which records the picture 10, the recorded test picture being used to analyze which corrections need to be carried out. In this case, as illustrated in the appended FIG. 1, use is made of a camera 11 which is arranged, for example, on the projector 1 and views the test picture 10 which is being projected onto the screen 2. A CCD camera is customarily used for this purpose.

The test picture 10 may be of any desired form. Use will generally be made of a test picture 10 as illustrated in FIG. 2, or at least of a comparable test picture.

In this Figure, the projector test picture 10 is divided into different zones 12, and an intersection of lines is provided in each zone. For the sake of clarity, the test picture shown in FIG. 2 has only been divided into a limited number of zones.

The abovementioned intersection of lines is formed by a grid-like pattern, which can be called up separately for the three colors, so that it is possible, as desired, to project two or three grid-like patterns onto one another. Normally, the grid-like pattern 13 of the green light comprises lines, which are perfectly horizontal and vertical, because the cathode ray tube 4 is situated centrally in front of the screen 2, and this pattern 13 is therefore also used as the reference pattern. By projecting a grid-like pattern 14 of another color, which normally should coincide with the pattern 13, it is possible to observe which corrections need to be carried out.

Therefore, using the test picture 10, various corrections can be carried out for each zone.

On the one hand, it is desirable for the gridlike patterns, for example 13 and 14, not to be displaced with respect to one another, which is known as convergence correction.

The grid-like patterns can also be used to provide for geometry correction, in which, as is known, the aim is to ensure that the grid is orthogonal and does not widen in the manner of a trapezium in one direction or another.

Other test pictures can be used to carry out other corrections. When correcting the focus, for example, it is ensured that the electron beam, which is incident on the face plate, and therefore also the corresponding picture on the screen too, are sharp.

The same also applies with regard to minimizing the astigmatism. Astigmatism is the phenomenon, which occurs, inter alia, as a result of the fact that the electron beams in a picture tube do not intersect the faceplate orthogonally. Consequently, the virtual pixel, which is formed in this way, is elliptically distorted. It is clear that this elliptical distortion should preferably be corrected.

It is also possible to provide for contrast modulation correction. With this kind of correction, the intensity of the three projected colors is separately adjusted in the same way in order to compensate losses caused by light loss or by differences in projection distance and the like, in such a manner that there is the same amount of light at the edges as in the center of the picture.

Figure 3:
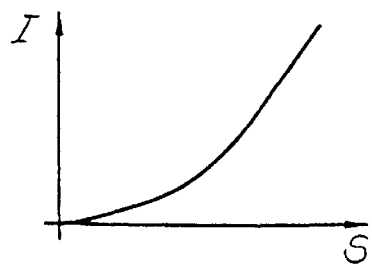

The so-called gamma correction is also important. This is because of the fact that, as illustrated in FIG. 3, the intensity I of the projected light is not proportional to the signal S applied to the cathode ray tube. Clearly, this non-linear relationship, referred to below as transfer curve, must also be taken into account if an optimum picture is to be formed.

The corrections mentioned above can be carried out separately for each projector 1. If a second projector 1A is used, as illustrated diagrammatically in FIG. 1, or even more than two projectors are used, it is moreover necessary to carry out various corrections in order to adapt the pictures 9 and 9A to one another, at least where it is a question of pictures 9-9A which together are to form a single entity. This may involve pictures which are projected next to one another, as illustrated in FIG. 1, with a certain overlap zone 15 or, according to a variant, pictures which are projected into or completely onto one another, in the latter case, for example, in order to double the light intensity at the location of the screen 2.

If a plurality of pictures 9-9A is being projected, at least the adjoining geometry or overlapping geometry has to be corrected.

Figure 4:
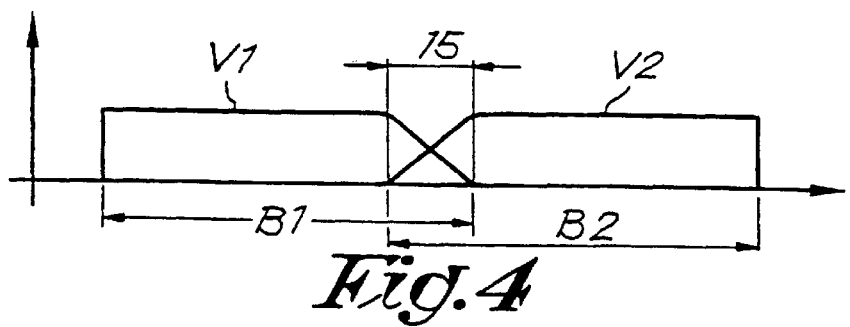

In the overlap zone 15, it is possible to provide a special adjustment, so that a so-called soft edge is formed for each picture, meaning that the pictures are deliberately attenuated at their overlapping edges, resulting in an overall uniform intensity without there being any noticeable transition. As is known, this is achieved by multiplying the signals relating to the widths B1 and B2 of the pictures 9 and 9A by gain factors V1 and V2 which behave as illustrated in FIG. 4.

The particular feature of the present invention consists in the fact that the projected picture 9 is automatically adjusted during normal use of the projector 1 or, if there are a plurality of projectors, of the various projectors 1-1A, i.e. they are automatically adjusted even after the corrections using the test pictures have been carried out.

The result of this automatic correction is that aberrations which manifest themselves as a function of factors which do not arise at the time at which the correction using the test picture 10 was carried out can still be corrected.

Figure 5:
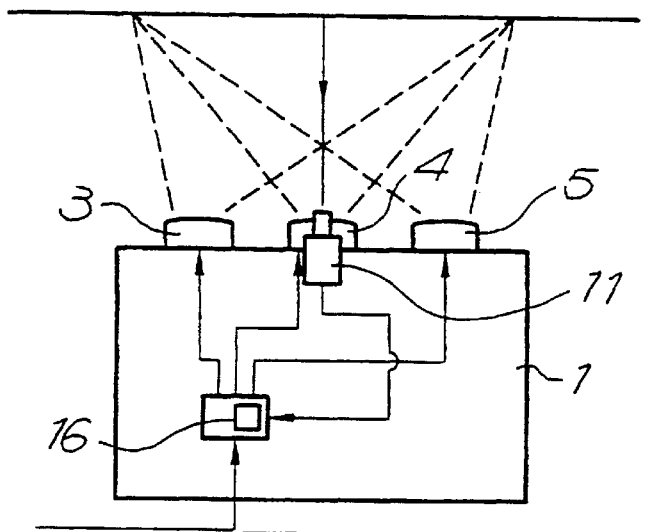

As is diagrammatically depicted in FIG. 5, according to a first aspect of the invention this is achieved by means of feedback, this feedback consisting in observing the projected picture 9, checking whether any aberrations occur, and adjusting the abovementioned corrections as a function of these aberrations, in order to minimize them.

For this feedback, it is possible to make use of the abovementioned camera 11 which views and records certain sections of the projected picture, for example the sections which are formed by the centers of the abovementioned zones 12. Then, on the basis of the recorded data, it is investigated which aberrations occur in the picture 9 and the necessary adjustments are carried out. The aberrations and the necessary corrections are determined and calculated in a computation unit 16, which is accommodated in the control system of the projector 1.

Figure 6:
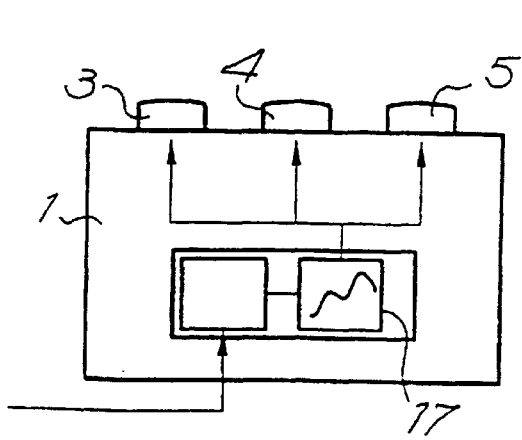

As diagrammatically depicted in FIG. 6, it is possible, according to another aspect of the invention, to make use of mathematical models which are based on the influencing factors which are relevant to the adjustment in question. In this case, these mathematical models, which are diagrammatically indicated in the figure by means of the block 17, are stored in a memory. Depending on specific parameters, which change during the use of the projector, these mathematical models are used to calculate which adjustments need to be carried out.

It should be noted that the term "mathematical models" is to be interpreted in a very broad sense. A mathematical model of this nature may, for example, comprise a curve, which is written to the memory. However, such a model may also comprise a calculation function with which an output value can be automatically calculated by inputting a specific input value. A model of this kind may also comprise series of values, which form tables from which data can be derived.

Figure 7:
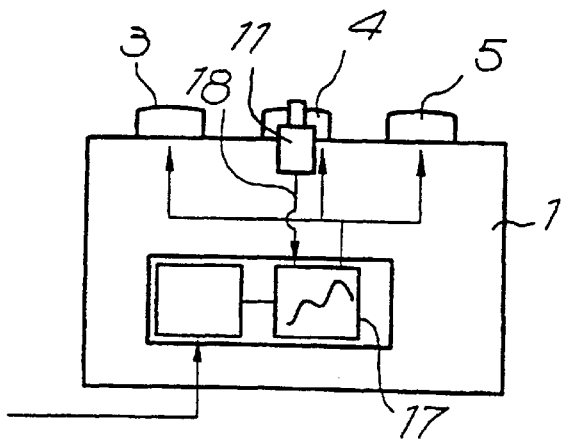

According to yet another aspect of the invention, the use of the mathematical models may be combined with the abovementioned feedback. As is diagrammatically depicted in FIG. 7, the signal 18 is used to adapt the mathematical model, for example to change parameters of this model.

The use of mathematical models has the advantage that rapid adjustment is possible, since, as it were, action can be taken even before projecting.

According to an important application of the invention, the mathematical models will provide for a time-dependent adjustment. In this case, it is possible to take into account the total on-period of the projectors in question, for example in order to take into account the ageing of certain parts of the projector 1, for example the ageing of the picture tubes used. However, it will be clear that it is possible, according to the invention, for such adjustment as a function of the ageing also to be carried out in other ways, for example by carrying out certain measurements in the projector so as to provide data from which the ageing phenomena can be derived.

It is also possible, according to the invention, to take into account the time which has elapsed from the last time the projector 1 in question was switched on. This is important above all in order to take into account, for example by means of a mathematical model, phenomena such as mechanical drift, in other words mechanical properties which change over the course of time, for example as a result of the projector 1 heating up.

In a particular embodiment, the adjustment also takes place as a function of the position of the projected light with respect to the picture, in order to compensate position-related aberrations. In this case, it is possible, according to the invention, to take into account the fact that the ageing process is not uniform for the entire surface of the picture-forming elements used, i.e. the cathode ray tubes 3-4-5.

In another particular embodiment, the adjustment is carried out as a function of the magnitude and/or intensity of the signal, which is to be or is being projected, if appropriate in relation to the position on the picture.

Obviously, it will be preferable to provide for different adjustments for the different colors.

The method described above, and more especially the various possibilities for carrying out this method, may be applied to all the abovementioned forms of correction, which is intended to mean corrections relating to convergence, geometry, adjoining geometry and/or overlapping geometry, focus, astigmatism, contrast modulation, gamma correction and soft edge, as well as to all other forms of correction.

It is clear that the method described above, which provides for taking into account corrections during normal use of the projector, may also provide for corrections which may already have been employed during the preliminary adjustment using the test picture. After all, it will be clear that, for example, aberrations caused by the projector heating up may already have been taken into account during the projection of the test picture.

A number of more specific possible applications of the invention, as well as the importance of these, are described below.

Figure 8:
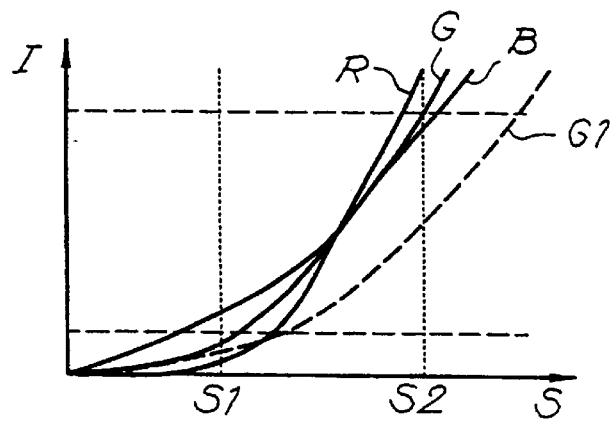
FIG. 8 depicts various transfer curves and the influence of ageing on these curves.

FIG. 8 shows similar curves to that shown in FIG. 3, but separately for the three respective colors. These are the curves R-G-B, respectively indicating the colors red, green and blue. It will be clear from this figure that different transfer curves for the different colors have to be taken into account. At an input value S1, less red is to be provided than green, while the opposite applies in the case of an input value S2.

Ageing of the picture tube, in other words the cathode ray tube, causes the transfer curves to shift. In FIG. 8, this is illustrated by means of the curve GI. This curve represents the transfer curve for the green light after a certain level of ageing by comparison with the time at which the curve G was applicable. This is not taken into account in the projectors which are currently known. According to the present invention, it is possible to use a mathematical model which takes into account the ageing, so that the transfer curve G1 which is applicable at any particular time will automatically be used instead of the original transfer curve G. Using the abovementioned feedback, the transfer curve G1 presented can be refined further at any time.

The same reasoning also applies to the red and blue picture tubes, although the progress of the shift is not necessarily the same as that of the red picture tube, for example. One reason for this is the fact that different phosphors have different ageing properties. The projected picture content is also important in this context. For example, if a bright red picture is projected for 50% of the time, it is obvious that the red picture tube will age more quickly. This can be taken into account by considering, according to the invention, the projected video content or picture content.

As mentioned above, position-dependent corrections may also be carried out. In this way, the invention makes it possible to correct aberrations that are caused by the phenomenon described below.

By projecting pictures via a lens system, the projected light at the sides of the picture will be less than in the center of the picture. This phenomenon is known as "brightness fall off". In order to alleviate this phenomenon, electrical compensation can be carried out by modulating the intensity of the projected light in such a manner that more light is provided to the sides and less to the center. The result of this is that the ageing process is non-uniform and that a light distribution, which is not uniform in terms of color, is produced. This means, for example, that for the green light there will be a tendency to move along the curve G in the case of a projection into the center of the picture and to move along the curve G1 in the event of a projection onto the edge of the picture.

Even if ageing phenomena are not taken into account, in the center there will be an input value S1, while at the edges it is necessary to take into account the value S2. In the example, the result of this is that the picture will be differently colored at the edges from in the center, thus having an adverse effect on the color uniformity.

By, according to the invention, providing feedback or using mathematical models as mentioned above, this factor can be taken into account.

By using a mathematical model which provides for adjustments to be carried out during projection, the invention also makes it possible to carry out a correction which is contrast-dependent, in such a manner that aberrations which normally occur when the contrast setting of the projector 1 changes are eliminated. This is explained below with reference to FIG. 9.

Figure 9:
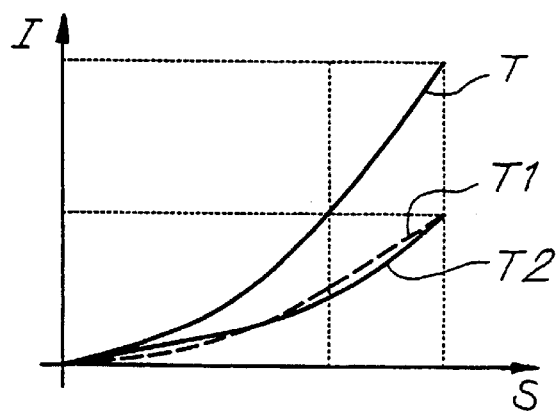
FIG. 9 depicts a transfer curve and the influence of a change in contrast on this curve.

FIG. 9 shows the transfer function T for a specific color, at full contrast. When the contrast is changed, for example halved, it is known to halve the values associated with the transfer function T, so that the curve T1 is followed. In reality, however, the curve T2 should be followed. This problem can also be eliminated by using feedback or a suitable mathematical model in accordance with the present invention.

Using yet another mathematical model, it is possible to carry out permanent corrections as a function of the video signal supplied. Since the video signal is permanently changing, it is clear that the operating point will constantly move up and down the transfer curves. In the case of CRT projectors, this means that the projected intensity is dependent on the video content, which in turn affects the reproduction of the color fidelity. According to the invention, in this case too it is possible to provide for a permanent adjustment, which takes into account the content of the video signal and the associated aberrations.

Furthermore, it is also possible to take into account other effects, such as the analogue behavior of the system which lies behind the waveforms, such as for example the low-pass performance. Obviously, this will also distort the light intensity which is ultimately obtained, so that the light distribution will not be uniform. In this case too, it is possible, according to the invention, to carry out a correction, for example using a mathematical,model which takes this fact into account.

The abovementioned influence relating to the analogue behavior is source-frequency-dependent. According to the invention, it is also possible to provide for a frequency-dependent adjustment.

Furthermore, it is possible to take into account electrical focal drift, the meaning of which is that the focus setting shifts over time; after all, the focus has an influence on the color fidelity: the poorer the focus, the lower the light intensity of a pixel becomes. This in turn causes the color temperature to differ and be incorrect. This problem can also be alleviated by means of the method of the invention, provided that a mathematical model which takes this into account is used.

Mechanical drift, in other words mechanical changes which occur during the course of time, for example as a result of heating or the like, can be taken into account in a similar manner.

Finally, it is also possible, according to the invention, to take into account the spectral radiation properties of the screen. The meaning of this expression is that a picture which has perfect color fidelity on one screen will not necessarily be perfect on a different screen. Using observations taken using the camera 11, it is possible, for example, to investigate which corrections have to be applied, these corrections being determined according to the invention, for example, using a mathematical model.

The abovementioned effects can also be taken into account in the abovementioned soft edge.

When processing the signals, in particular the signal from the camera 11, it is desirable to increase the resolution using interpolation.

There are various methods for interpolating data in the time domain, including linear, spline, Bezier, parabolic and sinc interpolation, as well as others. A linear interpolation is quick but does not provide a smooth curve. Bezier and spline interpolations do provide a smooth curve but, on the downside, are very time-consuming. A parabolic interpolation has the drawback that no linear curves are possible. A sinc interpolation suffers from undesirable oscillations.

Drawbacks to the use of known interpolations are that it must fulfill all of the following exigencies:

Continuous and smooth waveforms: if discontinuities are detected in the signal, it is possible that the system will not react linearly any more when receiving such a signal. This exigency is very strong, and makes a fast interpolation not easy to reach.

No overshoot or underflow: overshoot or underflow cause serious discontinuities. If for example a digital to analog converter (DAC) is used, this DAC needs integers at its input. As these integers are represented by a specific number of bits (for example 8) there is always a minimum and a maximum value which can be interpreted by the DAC. For example: 256 is in a binary representation a 9-bit value. The 8-bit DAC cannot interpret this $9^{th}$ bit, so that the $9^{th}$ bit will be neglected. In the case of 256, the other 8 bits are 0, so that 256 will be interpreted as 0, what of course gives wrong results. Thus, discontinuities are introduced in the wavefronts if overshoot or underflow exists.

Linear curves must be possible: lots of waveforms which must be generated in projectors, are strongly based on sawtooth curves, which deviate mostly from the sawtooth model at the beginning and at the end.

Fast calculation must be possible: as calculations must be carried out in real-time or at least very quickly in order to give the user or the adjustment device a direct feedback to raise the time needed for adjustment, an easy way must be found for interpolating. This saves on useless processing hardware, which is important because in the technology in reference cost price is an important factor.

According to a particular aspect of the invention, which is preferably employed in combination with the above, but may also be used in other projector adjustment systems, a method is provided for determining intervening points in which the drawbacks of the abovementioned interpolation techniques are eliminated. This method is explained below with reference to FIGS. 10 to 15.

Figure 10:
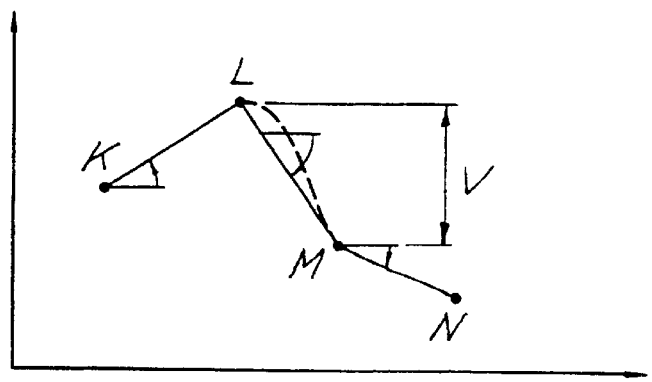

FIG. 10 shows a number of points K-L-M-N, between which it is necessary to carry out an interpolation, in order to determine intermediate values.

According to the present invention, a number of basic waveforms are provided, preferably as illustrated in FIGS. 11 to 15.

The first basic waveform F1 has a gradient which gradually increases and then gradually decreases. The second basic waveform F2 has an essentially constant gradient followed by a gradually decreasing gradient. The third basic waveform F3 has a gradually increasing gradient followed by an essentially constant gradient. The fourth basic waveform F4 has an essentially constant gradient along the entire line. The fifth basic waveform F5 is a horizontal line.

Now, according to the invention, data relating to the directional coefficients of the connecting lines K-L, L-M and M-N between these points is determined for at least three, and preferably four successive points K-L-M-N, and using this data it is determined which basic waveforms are to be used in order to form a connection. In determining the basic waveform to be applied between L and M, it is preferable to take into account both the directional coefficient of the connecting line between L and M and the directional coefficients of the connecting lines K-L and M-N of the adjoining intervals.

The data concerning the directional coefficients taken into account preferably comprise information on whether such a directional coefficient is positive or negative and on the magnitude of this directional coefficient.

In the case of FIG. 10, the directional coefficient between L and M is negative, but is preceded by a connecting line K-L with a positive directional coefficient. Furthermore, the connecting line L-M is followed by a connecting line with a negative directional coefficient. According to the invention, it is then possible to decide to apply the basic curve F3 between the points L and M, this curve being inverted.

The basic waveforms can also be combined with one another.

It is also possible to attenuate or reinforce the basic waveforms in order to ensure that they correspond accurately to the difference V which is to be spanned.

Thus it is possible, for example, to attenuate the basic waveform F1 to an extent of 40% and to add 10% to the basic waveform F4 in this: case, all as a function of the abovementioned directional coefficients. It will be clear that suitable algorithms can be worked out.

To carry out the abovementioned method, use is preferably made of the device 19, more particularly an electronic circuit, with a circuit diagram as illustrated in FIG. 16.

The device 19 essentially comprises a memory 20, in which data relating to waveforms which are required to create a projected picture can be stored and in which, if appropriate, data relating to the mathematical models can also be stored; a computation unit 21 which adjusts the abovementioned waveforms in accordance with the method described above; and at least one digital/analogue converter 22 in order to supply the end result to the control means 23 of the relevant picture-forming element 24, for example the picture tube of the CRT projector.

The video signal 25 is supplied to the computation unit 21 via an analogue/digital converter 26.

Control signals and influencing factors relating to the corrections to be carried out are presented via the input 27.

The contrast modulation signal is applied to the input 28.

It should be noted that the device is not aimed at one specific application, which means that depending on the signal at the input 271 the device 19 can be switched into one mode or another in order to carry out a specific task.

As illustrated, it is possible to employ a plurality of digital/analogue converters 22, each of which is intended to carry out different control functions.

Obviously; the device may also be equipped with means which also allow manual adjustment or manual intervention on the adjustment, for example by inputting data via a keyboard or the like.

The memory 20 is preferably a RAM to which vectorial information is written.

It is clear that the device 19 may be designed in such a manner that it interacts not with only one picture-forming element 24, but with a plurality of these elements at the same time. On the other hand, the possibility of providing a dedicated device 19 for each picture-forming element 24 in question is also not ruled out.

Preferably, the device 19 forms a fixed part of the projector, which is important if it is necessary to take into account projector-related data, such as ageing of the projector.

The present invention is in no way limited to the embodiments which have been described by way of example and are illustrated in the figures; rather, a method and device of this nature for adjusting a projector, more especially a CRT projector, can be realized in accordance with numerous variants without departing from the scope of the invention.

What is claimed is:

1. Method for automatically adjusting at least one projected picture (9-9A), each picture (9-9A) being projected by a projector (1-1A) generating a number of light beams of different color, the projector having a first operation phase during which test pictures are projected for correction of the projector and a second operation phase being normal use of the projector during which a video signal is projected, the projected picture (9-9A) being automatically adjusted with respect to one or more of convergence, geometry, adjoining geometry, overlapping geometry, focus, astigmatism, contrast modulation, gamma correction, soft-edge, picture tube ageing wherein, by means of feedback during normal use of the projector (1-1A), a time-dependent automatic adjustment is provided by means of mathematical models which are based on the influencing factors which are relevant for the before mentioned adjustment.

2. Method according to claim 1, characterized in that the automatic adjustment is carried out on the basis of the contents of a video signal, which is either the input signal which is supplied to the projector (1) or a video signal emanating from a camera (11) which is directed at the picture (9-9A), the video signal comprising arbitrary video images.

3. Method according to claim 1, characterized in that the mathematical models, during use of the projector (1-1A), are adapted by means of the feedback as a function of the result obtained, so as to obtain an optimum picture.

4. Method according to claim 1, characterized in that at least the total on-period of the relevant projector (1-1A) is taken into account in this adjustment.

5. Method according to claim 1, characterized in that at least the time which has elapsed since the relevant projector (1-1A) was last switched on is taken into account in this adjustment.

6. Method according to claim 1, characterized in that the adjustment takes place as a function of the ageing of the picture-forming elements (24), more particularly picture-forming tubes, which are employed, which function of the ageing is reflected in the mathematical model used for carrying out the adjustment.

7. Method according to claim 1, characterized in that the adjustment takes place as a function of the position of the projected light with respect to the picture (9-9A), and in that the fact that the ageing process is not uniform for the entire surface of the picture-forming element used is taken into account in this adjustment, both facts being reflected in the mathematical model used for carrying out the adjustment.

8. Method according to claim 1, characterized in that the adjustment takes place as a function of the magnitude and/or intensity of the signal which is to be or is being projected, if appropriate also related to the position on the picture (9-9A).

9. Method according to claim 1, characterized in that different adjustments are provided for the different colors.

10. Method according to claim 1, characterized in that the automatic adjustment at least takes into account, via the mathematical model used for carrying out the adjustment, one or more of the following phenomena: mechanical drift, for example as a result of the projector or projectors (1-1A) becoming heated; low-pass performance; frequency-dependency; electrical focal drift; and spectral radiation properties of the screen.

11. Method according to claim 1, characterized in that one or more of the abovementioned corrections is/are also used during the preceding adjustment using a test picture (10).

12. Method according to claim 1, characterized in that the picture (9-9A) is divided into different zones (12), each zone (12) having an adjustment-point location, and in that an interpolation is used for determining intervening points for carrying out the adjustments.

13. Method according to claim 12, characterized in that at least five basic waveforms (F1 to F5) are used for the interpolation, which may be employed with both a negative and a positive gradient, said basic waveforms being
   a first basic waveform (F1) having a gradient which gradually increases and then gradually decreases;
   a second basic waveform (F2) having an essentially constant gradient followed by a gradually decreasing gradient;
   a third basic waveform (F3) having a gradually increasing gradient followed by an essentially constant gradient;
   a fourth basic waveform (F4) having an essentially constant gradient along the entire line; and
   a fifth basic waveform (F5) formed by an essentially flat line,
in that, for at least three successive adjustment-point locations, data relating to the directional coefficients (slope of direction) of the connecting lines between the values associated with these adjustment-point locations is collected, and in that a choice is made between the basic waveforms used to carry out the interpolation as a function of this data relating to the directional coefficients so that continuous and smooth waveforms are obtained, without overshoot nor underflow.

14. Method according to claim 13, characterized in that the choice is made on the basis of, inter alia, whether the directional coefficients are negative, positive or zero, as well as on the basis of the directional coefficients (slope of direction) of the connecting line between an adjustment-point location and the previous adjustment-point location, and the directional coefficients (slope of direction) of the connecting line between said adjustment-point location and the next adjustment-point location.

15. Method according to claim 14, characterized in that at least four successive adjustment-point locations are used.

16. Method according to claim 13, characterized in that different basic waveforms, which are optionally inverted and optionally rescaled, are added for the interpolation between successive locations.

17. Method for correcting a projector, characterized in that the picture is divided into different zones (12), each zone having an adjustment-point location, and in that a number of basic waveforms (F1 to F5) are used for the interpolation, which may be employed with both a negative and a positive gradient, said basic waveforms being
   a first basic waveform (F1) having a gradient which gradually increases and then gradually decreases;
   a second basic waveform (F2) having an essentially constant gradient followed by a gradually decreasing gradient;
   a third basic waveform (F3) having a gradually increasing gradient followed by an essentially constant gradient;
   a fourth basic waveform (F4) having an essentially constant gradient along the entire line; and
   a fifth basic waveform (F5) formed by an essentially flat line,
in that, for at least three successive adjustment-point locations, data relating to the directional coefficients of the connecting lines between the values associated with these adjustment-point locations is collected, and in that a choice is made between the basic waveforms used to carry out the interpolation as a function of this data relating to the directional coefficients so that continuous and smooth waveforms are obtained, without overshoot nor underflow.

18. Method according to claim 17, characterized in that the choice is made on the basis of, inter alia, whether the directional coefficients are negative, positive or zero, as well as on the basis of how the directional coefficients of the successive zones follow one another.

19. Method according to claim 17, characterized in that at least four successive adjustment-point locations are used.

20. Method according to claim 17, characterized in that different basic waveforms, which are optionally inverted and optionally rescaled, are combined in the interpolation between successive locations.

21. Device (19) for automatically adjusting at least one projected picture (9-9A) with respect to one or more of convergence, geometry, adjoining geometry, overlapping geometry, focus, astigmatism, contrast modulation, gamma correction, soft-edge, picture tube ageing, each picture (9-9A) being projected by a projector (1-1A) generating a number of light beams of different color, the projector having a first operation phase during which test pictures are projected for correction of the projector and a second operation phase being the normal use of the projector during which a video signal is projected, characterized in that the device at least comprises a memory (20) in which data relating to mathematical models which are based on influencing factors which are relevant for adjustments are stored;

connected to the memory (20), a computation unit (21) to which a video signal (25) is supplied, which computation unit (21) is adapted to adjust the video signal during normal use of the projector according to any of previous claims based on the mathematical models stored in the memory (20), the adjusted video signal being presented to an output of the computation unit (21); and connected to the output of the computation unit (21), at least one digital/analogue converter (22) for supplying the end result to a control means (23) of the projector (1-1A).

22. Device according to claim 21, characterized in that it contains a plurality of digital/analogue converters (22), which are each connected to the output of the computation unit (21), and which are each intended to carry out different control functions, such as adjustment of e.g. convergence, geometry, adjoining geometry and/or overlapping geometry, focus, astigmatism, contrast modulation, gamma correction, soft-edge, and/or picture tube ageing.

23. Projector, characterized in that it is provided with a device (19) according to claim 21 or 22 or 25, this device (19) being adapted to this projector (1-1A).

24. Device according to claim 22, wherein the different control functions comprise one or more of adjustment of convergence, geometry, adjoining geometry, overlapping geometry, focus, astigmatism, contrast modulation, gamma correction, soft-edge, picture tube ageing.

25. Device according to claim 21, characterized in that it is provided with means which also allow a manual adjustment or a manual intervention in the adjustment, which means are connected to input 27.

26. Device according to claim 25, wherein the means which allow a manual adjustment or a manual intervention in the adjustment comprises a keyboard.

27. Projector according to claim 23, characterized in that it is a CRT projector, a light valve projector or an LCD projector.

* * * * *

UNITED STATES PATENT AND TRADEMARK OFFICE
CERTIFICATE OF CORRECTION

PATENT NO. : 6,717,625 B1
DATED : April 6, 2004
INVENTOR(S) : Robbie Thielemans

It is certified that error appears in the above-identified patent and that said Letters Patent is hereby corrected as shown below:

Column 4,
Line 2, delete period after "blue".

Column 6,
Line 10, delete "s" from "models".

Column 10,
Line 22, delete colon after "this".
Line 45, delete "1" from "271".
Line 50, delete semicolon.

Column 11,
Line 11, add -- the -- after "being".
Line 17, add -- comma -- after "ageing".
Line 21, after "adjustment" add -- , the feedback comprising observing the projected picture (9-9A) by means of a camera (11) which is directed at the picture, checking whether there are any aberrations, and carrying out the time-dependent automatic adjustment as a function of these aberrations --.
Lines 26-27, delete "which is directed at the picture".

Column 13,
Line 30, after "comprises" add -- observing means (11) for observing the projected picture (9-9A) by means of a camera (11) which is directed at the picture during normal use of the projector and generating a picture signal; --.
Line 33, after "memory (20)" add -- and to the observing means (11), --.
Line 36, delete "according to any of previous claims".

UNITED STATES PATENT AND TRADEMARK OFFICE
CERTIFICATE OF CORRECTION

PATENT NO. : 6,717,625 B1
DATED : April 6, 2004
INVENTOR(S) : Robbie Thielemans

It is certified that error appears in the above-identified patent and that said Letters Patent is hereby corrected as shown below:

<u>Column 14,</u>
Line 1, after "projector" add -- after an initial period for correction, the adjustment being based on the picture signal obtained form the observing means (11) and --.
Lines 13-16, delete "such as...ageing".
Line 25, change "claim 21" to -- claim 22 --.

Signed and Sealed this

Twelfth Day of October, 2004

JON W. DUDAS
*Director of the United States Patent and Trademark Office*